United States Patent
Gardner et al.

(10) Patent No.: US 9,188,494 B2
(45) Date of Patent: Nov. 17, 2015

(54) MEASUREMENT OF FLUID TEMPERATURES

(71) Applicant: Kulite Semiconductor Products, Inc.

(72) Inventors: Robert Gardner, Westwood, NJ (US); Louis DeRosa, Wayne, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 245 days.

(21) Appl. No.: 13/828,472

(22) Filed: Mar. 14, 2013

(65) Prior Publication Data

US 2014/0269835 A1  Sep. 18, 2014

(51) Int. Cl.
*G01K 13/02* (2006.01)
*G01K 7/00* (2006.01)
*G01K 1/08* (2006.01)

(52) U.S. Cl.
CPC . *G01K 13/02* (2013.01); *G01K 1/08* (2013.01)

(58) Field of Classification Search
CPC .................................................. G01K 13/02
USPC ......................................................... 374/179
See application file for complete search history.

(56) References Cited

U.S. PATENT DOCUMENTS

| 3,566,676 | A | * | 3/1971 | Hays | 3/61.76 |
|---|---|---|---|---|---|
| 5,628,565 | A | * | 5/1997 | Hagen et al. | 374/143 |
| 6,609,825 | B2 | * | 8/2003 | Ice et al. | 374/138 |
| 6,974,250 | B2 | * | 12/2005 | Severson | 374/138 |
| 2004/0114664 | A1 | * | 6/2004 | Park | 374/179 |
| 2007/0252672 | A1 | * | 11/2007 | Nyffenegger | 338/28 |
| 2011/0150033 | A1 | * | 6/2011 | Egan et al. | 374/141 |
| 2014/0037430 | A1 | * | 2/2014 | Thorpe et al. | 415/118 |
| 2014/0064334 | A1 | * | 3/2014 | Watkins et al. | 374/179 |

FOREIGN PATENT DOCUMENTS

CN  201852643 U  *  6/2011

* cited by examiner

*Primary Examiner* — Lisa Caputo
*Assistant Examiner* — Jamel Williams
(74) *Attorney, Agent, or Firm* — Troutman Sanders, LLP; James E. Schutz; Mark Lehi Jones

(57) ABSTRACT

A method, device, and system for improved measurement of fluid temperatures are provided. In one embodiment, a temperature probe structure comprises a header having a cavity; a longitudinal probe disposed at least partially within the cavity of the header; a temperature detector disposed within the longitudinal probe; and an insulator disposed between the header and the longitudinal probe for insulating the longitudinal probe from the header.

20 Claims, 4 Drawing Sheets

MEASUREMENT OF FLUID TEMPERATURES

TECHNICAL FIELD

This disclosure generally relates to measuring temperatures and more particularly to improved measurement of fluid temperatures.

BACKGROUND

A resistance temperature detector (RTD) is a sensor used to measure temperature by correlating the resistance of the RTD element with temperature. The RTD element may consist of a length of fine coiled wire wrapped around a ceramic or glass core. The RTD element may be made from a higher thermally conductive material such as platinum, nickel, or copper. The material has a predictable change in resistance as the temperature changes, which is used to determine temperature. Further, the RTD may be used for measuring the temperature of solids, liquids and gases due to its long-term stability, ease of recalibration, repeatability, and precision over narrow temperature ranges. The RTD element may be fragile, so it is often placed inside a probe to protect it. However, the probe reduces the RTD's response time due to heat having to first transfer through the cover before reaching the RTD.

In one definition, thermal conductivity is the property of a material to conduct heat. Heat transfer across materials of higher thermal conductivity occurs at a higher rate than across materials of lower thermal conductivity. Further, materials of higher thermal conductivity are widely used in heat sink applications and materials of lower thermal conductivity are used as thermal insulation. A higher thermally conductive material such as copper has a thermal conductivity ranging from about three hundred and eighty-five Watts per meter Kelvin (385 $Wm^{-1}K^{-1}$) to about four hundred and one Watts per meter Kelvin (401 $Wm^{-1}K^{-1}$) at two hundred and ninety-three degrees Kelvin (293° K). A lower thermally conductive material such as glass has a thermal conductivity ranging from about eight-tenths Watts per meter Kelvin (0.8 $Wm^{-1}K^{-1}$) to about one and four-tenths Watts per meter Kelvin (1.4 $Wm^{-1}K^{-1}$) at two hundred and ninety-three degrees Kelvin (293° K).

In one example, the RTD may be made by disposing a conductive metal film onto a semiconductor substrate and etching the conductive metal film into a resistance temperature detector pattern. Inexpensive metals such as copper or nickel may sometimes be used as the conductive metal. However, these metals may be restricted in their temperature measurement range due to, for instance, their non-linear temperature-resistance relationships. To avoid this limitation, RTD designs may use platinum as the conductive metal. Due to its chemical inertness, platinum has a nearly linear temperature-resistance relationship to enable an RTD to more precisely measure temperature. However, to remain stable, platinum should remain in its pure form and be shielded from high temperatures or harsh environments. A variation of this cover for an RTD has been used to shield platinum from high temperatures or external environments. However, this variation may share some of the aforementioned limitations such as having a slow response time due to heat transfer. Thus, probes may not typically be used in applications requiring a rapid-response time. This may be especially true in applications requiring high temperatures or harsh environments, such as those commonly found in automobile engines and jet engines. In addition, the measurement of fluid temperature is important in many applications. In one definition, a fluid is a liquid or a gas. When the fluid is a liquid this measurement is easier to make. The higher density and heat capacity may mean that a larger probe with a higher thermal mass may be used without affecting the response time or accuracy adversely. However, when the fluid is a gas, the task may be more difficult. To measure air or other gases, an exposed sensor such as a thin film RTD or thermocouple may be used. These sensors may not be very robust and their use outside of a laboratory setting may be limited.

In another example, FIG. 1 illustrates a partial longitudinal cross-sectional view of a prior art temperature probe structure 100. The temperature probe structure 100 is configured to include a longitudinal probe 101, an RTD 103, a header 105, and a housing 107. Further, the header 105 and the housing 107 are disposed around and form a cavity 109. The probe structure 100 is disposed about a central axis 120, as shown in FIG. 1. The longitudinal probe 101 has a front portion and a back portion. The front portion of the longitudinal probe 101 is exposed such as to an external environment to be measured. The back portion of the longitudinal probe 101 is disposed within the cavity 109 of the header 105. The longitudinal probe 101 is coupled to the housing 107 using the header 105 as a thermally conductive seal. The header 105 and the housing 107 is made of a thermally conductive material such as metal. The longitudinal probe 101 is also made of a thermally conductive material such as metal. In one instance, the longitudinal probe 101 is welded to the header 105. In another instance, the longitudinal probe 101 is brazed to the header 105 such as by soldering with an alloy of copper and zinc at high temperature.

In FIG. 1, the RTD 103 is placed within the longitudinal probe 101. The metal-to-metal contact between the longitudinal probe 101 and the header 105 increases the likelihood of heat dissipating throughout the temperature probe structure 100. Thus, the temperature probe structure 100 is more conducive to measuring temperatures of a liquid since the thermal mass of the longitudinal probe 101 is smaller compared with the thermal mass of the liquid. However, the temperature probe structure 100 is less conducive to measuring temperatures of a gas since the thermal mass of the longitudinal probe 101 is too high for an accurate or fast measurement. Accordingly, there is a need to improve the measurement response and accuracy of fluid temperatures.

SUMMARY OF THE DISCLOSURE

The subject technology relates to methods, devices, and systems for improved measurement of fluid temperatures. In one embodiment, a temperature probe structure may be configured to include a header having a cavity. The temperature probe structure may be configured to include a longitudinal probe disposed at least partially within the cavity of the header. Further, the temperature probe structure may be configured to include a temperature detector disposed within the longitudinal probe. Finally, the temperature probe structure may be configured to include an insulator disposed between the header and the longitudinal probe for insulating the longitudinal probe from the header.

BRIEF DESCRIPTION OF THE FIGURES

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION

The following detailed description is merely illustrative in nature and is not intended to limit the present disclosure, or the application and uses of the present disclosure. Furthermore, there is no intention to be bound by any expressed or implied theory presented in the preceding field of use, background, or summary of the disclosure or the following detailed description. The present disclosure provides various examples, embodiments and the like, which may be described herein in terms of functional or logical block elements. Various techniques described herein may be used for improved measurement of fluid temperatures. The various aspects described herein are presented as methods, devices (or apparatus), and systems that may include a number of components, elements, members, modules, nodes, peripherals, or the like. Further, these methods, devices, and systems may include or not include additional components, elements, members, modules, nodes, peripherals, or the like.

Throughout the specification and the claims, the following terms take at least the meanings explicitly associated herein, unless the context clearly dictates otherwise. The term "connect," "connecting," and "connected" mean that one function, feature, structure, or characteristic is directly joined to or in communication with another function, feature, structure, or characteristic. The term "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive "or." Further, the terms "a," "an," and "the" are intended to mean one or more unless specified otherwise or clear from the context to be directed to a singular form. The term "include" and its various forms are intended to mean including but not limited to.

In the following description, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

Figure 1:
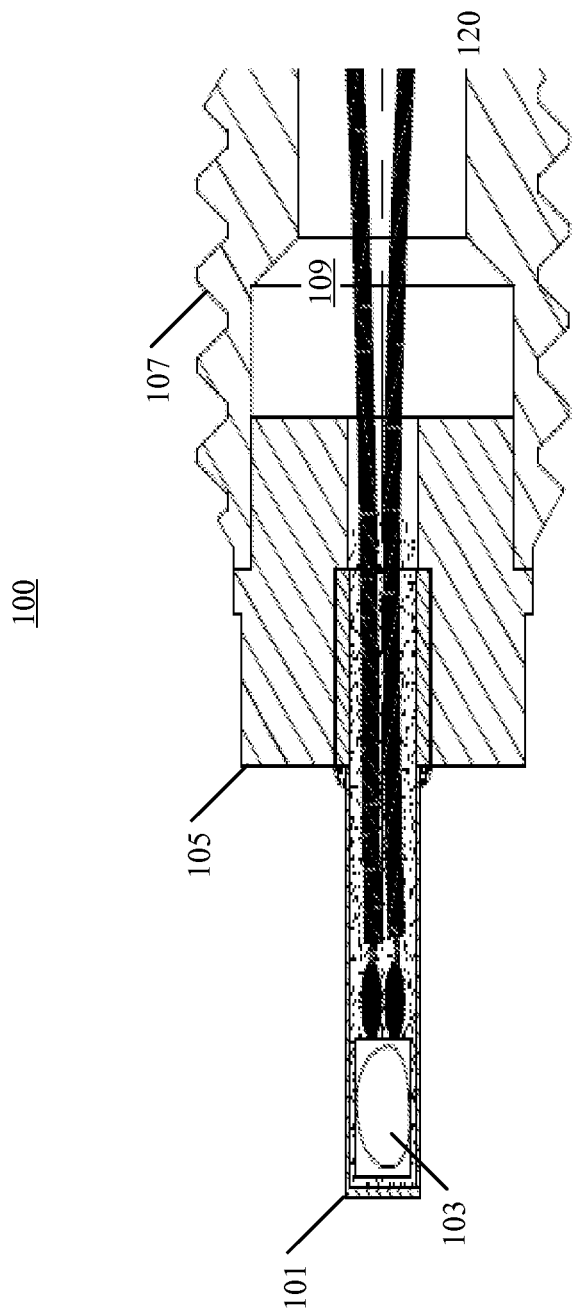
FIG. 1 illustrates a partial longitudinal cross-sectional view of a prior art temperature probe structure.
Figure 2:
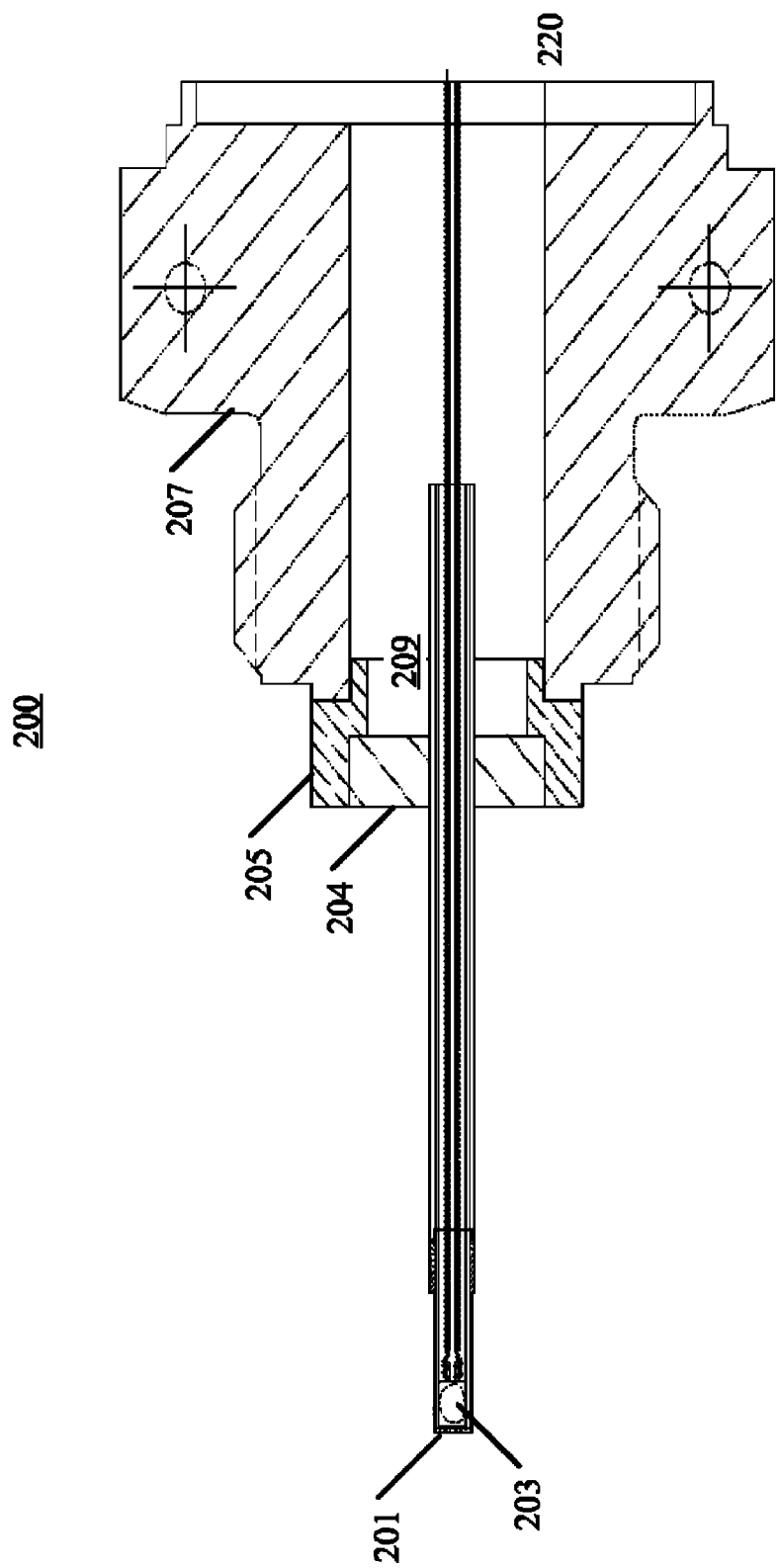
FIG. 2 illustrates a partial longitudinal cross-sectional view of one embodiment of a temperature probe structure in accordance with various aspects set forth herein.

This disclosure provides example methods, devices, and systems for improved measurement of fluid temperatures. For instance, by configuring a temperature probe structure using a thermally non-conductive seal in accordance with various aspects described herein, an improved temperature measurement capability providing a faster response or a higher accuracy for measuring the temperature of fluids is provided. For example, FIG. 2 illustrates a partial longitudinal cross-sectional view of one embodiment of a temperature probe structure 200 in accordance with various aspects set forth herein. The temperature probe structure 200 may be configured to include a longitudinal probe 201, a temperature detector 203, an insulator 204, a header 205, and a housing 207. The header 205 may refer to the header 205 or to the header 205 in combination with the housing 207. Further, the header 205 or the header 205 in combination with the housing 207 may be configured to include a cavity 209. The front portion 206 of the header 205 or the header 205 in combination with the housing 207 may be disposed around and form the cavity 209. The cavity 209 may contain a fluid, air, or be in a vacuum state. The cavity 209 may be adapted to receive an end of the longitudinal probe structure 200. The longitudinal structure 200 may be disposed about a central axis 220, as shown in FIG. 2, in a substantially symmetric configuration or may be offset in a substantially asymmetric configuration.

In FIG. 2, the insulator 204 may be disposed around the longitudinal probe 201. The back portion of the longitudinal probe 201 may be disposed within the cavity 209. The longitudinal probe 201 may be coupled to the header 205 via the insulator 204 to form a seal. The seal may be a thermally insulating seal or a hermetic seal. The seal may be constructed using a thermally insulating material such as glass or a ceramic material. In one example, the insulator 204 may be glass and the header 205 may be metal, so that the insulator 204 and the header 205 form a glass-to-metal seal such as a thermally insulating seal. Further, the glass-to-metal seal formed by the insulator 204 and the header 205 may pass electrical signals via wires through the back of the temperature probe structure 200 where a hermetic seal may be required. In another example, the seal may be formed using a hollow tube.

In this embodiment, the header 205 and the housing 207 may form one contiguous structure. The header 205 and the housing 207 may be two or more separate structures coupled together or may be part of one continuous material. The header 205 may be disposed around the insulator 204. The header 205 or the housing 207 may be used, for instance, to protect the insulator 204, reduce the cost of the temperature probe structure 200, increase the quality of the temperature probe structure 200, secure the various components of the temperature probe structure 200, or other similar characteristics. The header 205 or the housing 207 may be constructed using a higher thermally conductive material such as metal. The insulator 204 may insulate the longitudinal probe 201 from the header 205 or the header 205 in combination with the housing 207. Since the insulator 204 may be constructed using a lower thermally conductive material, the longitudinal probe 201 may be insulated from the header 205 or the header 205 in combination with the housing 207. Thus, the longitudinal probe 201 may not need to come into thermal equilibrium with the header 205 or the header 205 in combination with the housing 207 in order to reach a steady-state temperature with the fluid to be measured. Further, the heat-transfer properties of the header 205 or the header 205 in combination with the housing 207 may be reduced leading to more accurate measurements or more rapid response time of the measurement. The longitudinal probe 201, the header 205, or the housing 207 may be composed of a material having a thermal conductivity substantially higher than the insulator 204 or the cavity 209. In one example, the longitudinal probe 201, the header 205 and the housing 207 may be composed of a material having a thermal conductivity substantially higher than the insulator 204 and the cavity 209. In another example, the longitudinal probe 201 and the header 205 may be composed of a material having a thermal conductivity substantially higher than the insulator 204 and the cavity 209.

In FIG. 2, the housing 207 or the housing 207 in combination with the header 205 may be used to attach or secure the temperature probe structure 200 to another structure, protect all or a portion of the temperature probe structure 200, provide a means to handle or place the temperature probe structure 200, or another similar characteristic. The housing 207 or the housing 207 in conjunction with the header 205 may be used to form an O-ring seal with another structure or may be threaded, so that the temperature probe structure 200 may be attached to the other structure. The temperature detector 203 may be housed within the longitudinal probe 201. For instance, the temperature detector 203 may be placed within the longitudinal probe 201 and potted with a conductive epoxy or room temperature vulcanizing (RTV) silicone. Further, the temperature detector 203 may be an RTD, a thermocouple, or another device capable of detecting temperature. The longitudinal probe 201 may be disposed about the central axis 220, as shown in FIG. 2, in a substantially symmetric configuration or may be offset in a substantially asymmetric configuration. The longitudinal probe 201 may be a closed-end cylindrical probe, a closed-end cylindrical probe that is hollowed out to include a cavity, an open-ended probe, or another similar structure. Further, the traverse cross-section of the longitudinal probe 201 may be any shape such as a circle or a polygon. The longitudinal probe 201 may be made from a metal.

Figure 3:
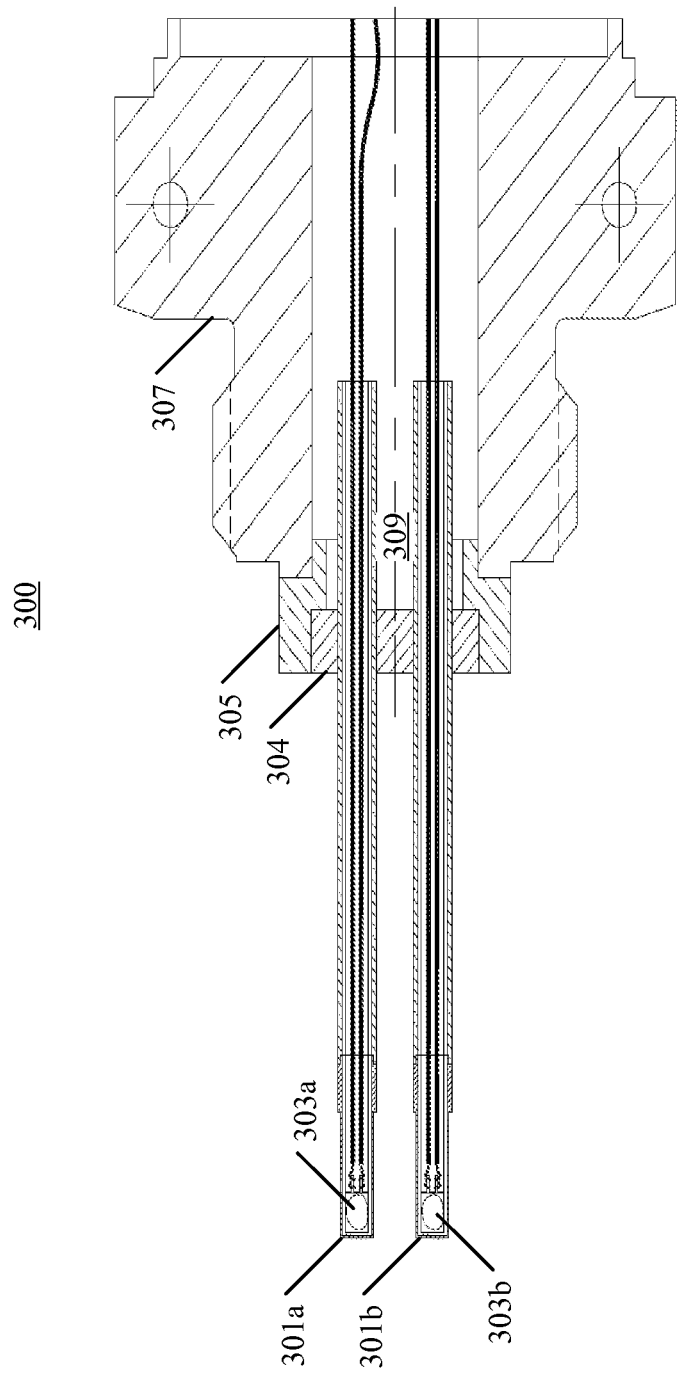
FIG. 3 illustrates a partial longitudinal cross-sectional view of another embodiment of a temperature probe structure in accordance with various aspects set forth herein.

FIG. 3 shows a capability of a temperature probe structure to include additional longitudinal probes. Such configuration may be used to add redundant sensing of temperature or to measure other characteristics. FIG. 3 illustrates a partial longitudinal cross-sectional view of another embodiment of a temperature probe structure 300 in accordance with various aspects set forth herein. Further, the temperature probe structure 300 may be configured to include longitudinal probes 301a and 301b, temperature detectors 303a and 303b, an insulator 304, a header 305, and a housing 307. The header 305 may refer to the header 305 or to the header 305 in combination with the housing 307. Further, the header 305 or the header 305 in combination with the housing 307 may be configured to include a cavity 309. The header 305 or the header 305 in combination with the housing 307 may be disposed around and form the cavity 309. The cavity 309 may include a fluid, air, or a vacuum state. The probe structure 300 may be disposed about a central axis 320, as shown in FIG. 3, in a substantially symmetric configuration or may be offset in a substantially asymmetric configuration.

In FIG. 3, the insulator 304 may be disposed around the longitudinal probes 301a and 301b. The cavity 309 may be disposed around the back portion of the longitudinal probes 301a and 301b. The longitudinal probes 301a and 301b may be coupled to the header 305 via the insulator 304 to form a seal such as a thermally non-conductive seal or a hermetic seal. The insulator 304 may be constructed using a lower thermally conductive material such as glass or a ceramic material. In one example, the insulator 304 may be ceramic and the header 305 may be metal, so that the insulator 304 and the header 305 may form a ceramic-to-metal seal such as a thermally insulated seal. Further, the glass-to-metal seal formed by the insulator 304 and the header 305 may pass electrical signals via wires through the back of the temperature probe structure 300 where a hermetic seal may be required. In another example, the seal may be formed using a hollow tube.

In this embodiment, the header 305 and the housing 307 may form one contiguous structure. The header 305 and the housing 307 may be two or more separate structures coupled together or may be part of one continuous material. The header 305 may be disposed around the insulator 304. The header 305 or the housing 307 may be used, for instance, to protect the insulator 304, reduce the cost of the temperature probe structure 300, increase the quality of the temperature probe structure 300, secure the various components of the temperature probe structure 300, or other similar characteristic. The header 305 or the housing 307 may be constructed using a higher thermally conductive material such as metal. The longitudinal probes 301a and 301b may also be constructed using a higher thermally conductive material such as metal. The insulator 304 may insulate the longitudinal probes 301a and 301b from the header 305 or the header 305 in combination with the housing 307. Since the insulator 304 may be constructed using a lower thermally conductive material, the longitudinal probes 301a and 301b may be insulated from the header 305 or the header 305 in combination with the housing 307. Thus, the longitudinal probes 301a and 301b may not need to come into thermal equilibrium with the header 305 or the header 305 in combination with the housing 307 in order to reach a steady-state temperature with the fluid to be measured. Further, the heat-transfer properties of the header 305 or the header 305 in combination with the housing 307 may be reduced leading to more accurate measurements or more rapid response time of the measurements.

In FIG. 3, the housing 307 or the housing 307 in combination with the header 305 may be used to attach or secure the temperature probe structure 300 to another structure, protect all or a portion of the temperature probe structure 300, provide a means to handle or place the temperature probe structure 300, or another similar characteristic. The housing 307 or the housing 307 in combination with the header 305 may be used to form an O-ring seal with another structure or may be threaded, so that the temperature probe structure 300 may be attached to the other structure. Each of the temperature detectors 303a and 303b may be placed within one of the longitudinal probes 301a and 301b or may be placed within one of the longitudinal probes 301a and 301b and potted with a conductive epoxy or RTV silicone. Each of the temperature detectors 303a and 303b may be an RTD or a thermocouple. In one example, one of the temperature detectors 303a and 303b may be an RTD and one of the temperature detectors 303a and 303b may be a thermocouple.

In FIG. 3, the longitudinal probes 301a and 301b may be disposed about the central axis 320, in a substantially symmetric configuration or may be offset in a substantially asymmetric configuration. The longitudinal probes 301a and 301b may be a closed-end cylindrical probe, a closed-end cylindrical probe that is hollowed out to include a cavity, or an open-ended probe. The traverse cross-section of the longitudinal probes 301a and 301b may be any shape such as a diamond or a square. The longitudinal probes 301a and 301b may be constructed from a higher thermally conductive material such as metal. Also, one of the longitudinal probes 301a and 301b may be different from another of the longitudinal probes 301a and 301b.

Figure 4:
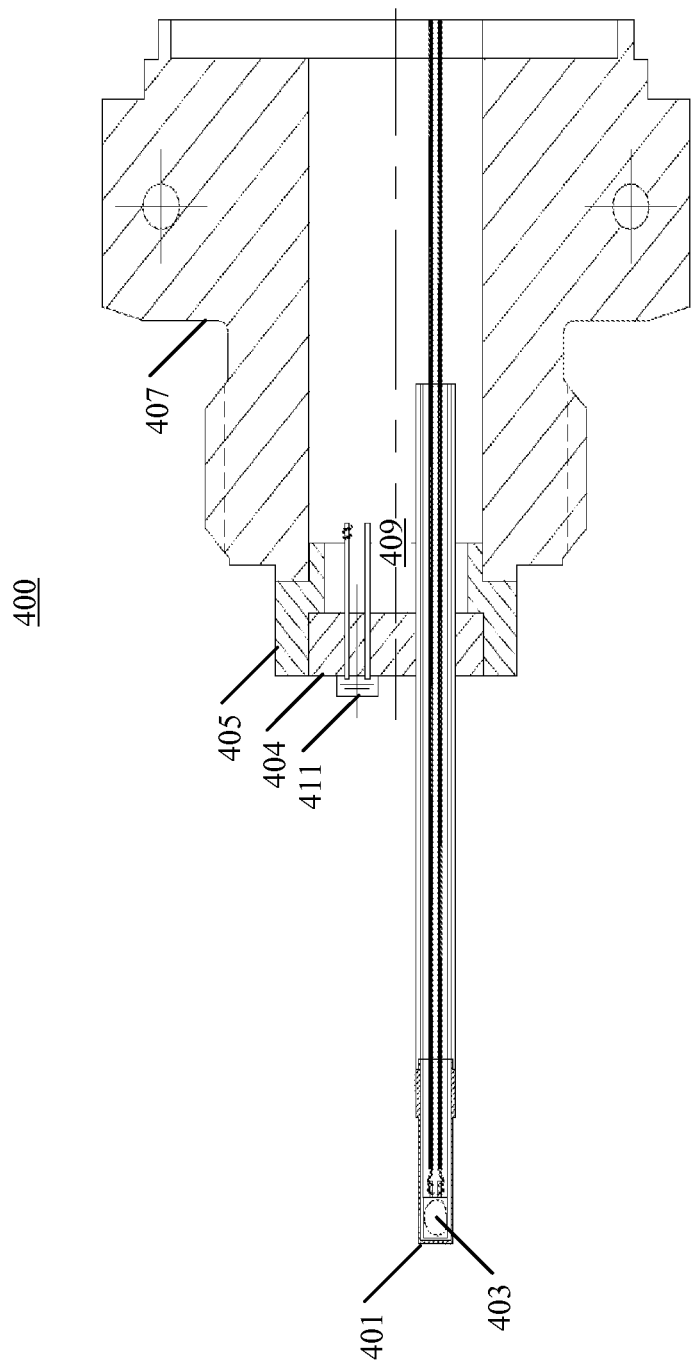
FIG. 4 illustrates a partial longitudinal cross-sectional view of another embodiment of a temperature probe structure in accordance with various aspects set forth herein.

FIG. 4 shows a capability of the temperature probe structures 200 and 300 to include additional sensors such as pressure sensors. Such configuration may be used to provide additional sensing capability. For instance, such configuration may be used to measure both temperature and pressure of a fluid. Further, such configuration may be used to add redundancy for measuring temperature or pressure by adding a longitudinal probe, a sensor, or both. FIG. 4 illustrates a partial longitudinal cross-sectional view of another embodiment of a temperature probe structure 400 in accordance with various aspects set forth herein. The temperature probe structure 400 may be configured to include a longitudinal probe 401, a temperature detector 403, an insulator 404, a header 405, a housing 407, and a sensor 411. In one example, the sensor 411 may be a pressure sensor. The header 405 may refer to the header 405 or to the header 405 in combination with the housing 407. Further, the header 405 or the header 405 in combination with the housing 407 may be configured to include a cavity 409. The header 405 or the header 405 in combination with the housing 407 may be disposed around and form the cavity 409. The cavity 409 may include a fluid, air or a vacuum.

In FIG. 4, the insulator 404 may be disposed around the longitudinal probe 401. The cavity 409 may be disposed around the back portion of the longitudinal probe 401. The longitudinal probe 401 may be coupled to the header 405 via the insulator 404 to form a seal such as a thermally insulated seal or a hermetic seal. The insulator 404 may be a thermally insulating material such as glass or a ceramic material. In one example, the insulator 404 may be glass and the header 405 may be metal, so that the insulator 404 and the header 405 may form a glass-to-metal seal such as a thermally non-conductive seal. Further, the glass-to-metal seal formed by the insulator 404 and the header 405 may pass electrical signals via wires through the back of the temperature probe structure 400 where a hermetic seal may be required. In another example, the seal may be formed using a hollow tube.

In this embodiment, the header 405 and the housing 407 may form one contiguous structure. The header 405 and the housing 407 may be two or more separate structures coupled together or may be part of one continuous material. The header 405 may be disposed around the insulator 404. The header 405 or the housing 407 may be used, for instance, to protect the insulator 404, reduce the cost of the temperature probe structure 400, increase the quality of the temperature probe structure 400, secure the various components of the temperature probe structure 400, or other similar characteristic. The header 405 or the housing 407 may be constructed using a higher thermally conductive material such as a metal. The longitudinal probe 401 may also be constructed using a higher thermally conductive material such as a metal. The insulator 404 may insulate the longitudinal probe 401 and the sensor 411 from the header 405 or the header 405 in combination with the housing 407. Since the insulator 404 may be constructed using a lower thermally conductive material such as glass, the longitudinal probe 401 may be insulated from the header 405 or the header 405 in combination with the housing 407. Thus, the longitudinal probe 401 may not need to come into thermal equilibrium with the header 405 or the header 405 in combination with the housing 407 in order to reach a steady-state temperature with the fluid to be measured. Further, the heat-transfer properties of the header 405 or the header 405 in combination with the housing 407 may be reduced leading to more accurate measurements.

In FIG. 4, the housing 407 or the housing 407 in combination with the header 405 may be used to attach or secure the temperature probe structure 400 to another structure, protect all or a portion of the temperature probe structure 400, provide a means to handle or place the temperature probe structure 400, or another similar characteristic. The housing 407 or the housing 407 in combination with the header 405 may used to form an O-ring seal with another structure or may be threaded, so that the temperature probe structure 400 may be attached to the other structure. The temperature detector 403 may be placed within the longitudinal probe 401. In one example, the temperature detector 403 may be placed within the longitudinal probe 401 and potted with a conductive epoxy or RTV silicone. The temperature detector 403 may be an RTD, a thermocouple, or another device for measuring temperature. The longitudinal probe 401 may be a closed-end cylindrical probe, a closed-end cylindrical probe that is hollowed out to include a cavity, or an open-ended probe. Further, the traverse cross-section of the longitudinal probe 401 may be any shape such as an oval or a square.

It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications, and variations that are within the spirit and scope of the claimed subject matter.

Although the present disclosure describes specific examples, embodiments, and the like, various modifications and changes may be made without departing from the scope of the present disclosure as set forth in the claims below. For example, although the example methods, devices and systems, described herein are in conjunction with a configuration for the aforementioned temperature probe structure, the skilled artisan will readily recognize that the example methods, devices or systems may be used in other methods, devices or systems and may be configured to correspond to such other example methods, devices or systems as needed. Further, while at least one example, embodiment, or the like has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims. Any benefits, advantages, or solutions to problems that are described herein with regard to specific examples, embodiments, or the like are not intended to be construed as a critical, required, or essential feature or element of any or all of the claims.

What is claimed is:

1. A temperature probe structure, comprising:
    a header having a cavity;
    a longitudinal probe disposed at least partially within the cavity of the header;
    a temperature detector disposed within the longitudinal probe; and
    a thermal insulator disposed between the header and the longitudinal probe for insulating the longitudinal probe from the header.

2. The temperature probe structure of claim 1, wherein the longitudinal probe is coupled to the header via the insulator to form a seal.

3. The temperature probe structure of claim 2, wherein the header is composed of a material having a thermal conductivity substantially higher than the thermal insulator.

4. The temperature probe structure of claim 1, wherein the longitudinal probe is composed of a material having a thermal conductivity substantially higher than the thermal insulator.

5. The temperature probe structure of claim 1, wherein the header is composed of a material having a thermal conductivity substantially higher than the cavity.

6. The temperature probe structure of claim 1, wherein the longitudinal probe is composed of a material having a thermal conductivity substantially higher than the cavity.

7. The temperature probe structure of claim 1, wherein the thermal insulator is composed of a ceramic material.

8. The temperature probe structure of claim 1, wherein the thermal insulator is composed of glass.

9. The temperature probe structure of claim 1, further comprising:
   a housing coupled to the header.

10. The temperature probe structure of claim 9, wherein the housing and the header are disposed around the cavity of the header.

11. The temperature probe structure of claim 9, wherein the housing is composed of a material having a thermal conductivity substantially higher than the cavity.

12. The temperature probe structure of claim 9, wherein the housing is composed of a material having a thermal conductivity substantially higher than the thermal insulator.

13. The temperature probe structure of claim 9, wherein the housing is used to attach the temperature probe structure to another structure.

14. The temperature probe structure of claim 13, wherein the housing is used to form an O-ring seal with another structure.

15. The temperature probe structure of claim 13, wherein the housing is threaded so that it can be attached to another structure.

16. The temperature probe structure of claim 1, wherein the temperature detector is a resistance temperature detector (RTD).

17. The temperature probe structure of claim 1, wherein the temperature detector is a thermocouple.

18. The temperature probe structure of claim 1, wherein the front portion of the longitudinal probe is exposed.

19. The temperature probe structure of claim 1, further comprising:
   a sensor having a front portion and a back portion, wherein the back portion of the sensor is disposed within the cavity of the header, wherein the thermal insulator is disposed around the back portion of the sensor, wherein the front portion of the sensor is exposed.

20. The temperature probe structure of claim 1, wherein the longitudinal probe is flush with the thermal insulator.

\* \* \* \* \*